United States Patent [19]
Siefert

[11] Patent Number: 6,047,261
[45] Date of Patent: Apr. 4, 2000

[54] METHOD AND SYSTEM FOR MONITORING AND ENHANCING COMPUTER-ASSISTED PERFORMANCE

[75] Inventor: David M. Siefert, Englewood, Ohio

[73] Assignee: NCR Corporation, Dayton, Ohio

[21] Appl. No.: 08/962,405

[22] Filed: Oct. 31, 1997

[51] Int. Cl.[7] .................................................. G06F 17/60
[52] U.S. Cl. .............................. 705/11; 702/182; 705/43; 705/188
[58] Field of Search ................................. 702/182; 705/11, 705/43, 188, 36; 345/337

[56] References Cited

U.S. PATENT DOCUMENTS

| | | |
|---|---|---|
| 4,947,346 | 8/1990 | Kamiya . |
| 4,964,077 | 10/1990 | Eisen et al. . |
| 5,018,082 | 5/1991 | Obata et al. . |
| 5,042,006 | 8/1991 | Flohrer ..................................... 345/337 |
| 5,201,034 | 4/1993 | Matsuura et al. ........................ 345/337 |
| 5,204,968 | 4/1993 | Parthasarathi . |
| 5,276,608 | 1/1994 | Nakagawa et al. ........................ 705/43 |
| 5,317,688 | 5/1994 | Watson et al. . |
| 5,425,140 | 6/1995 | Bloomfield et al. . |
| 5,441,415 | 8/1995 | Lee et al. . |
| 5,500,795 | 3/1996 | Powers et al. ............................. 705/11 |
| 5,513,308 | 4/1996 | Mori . |
| 5,535,321 | 7/1996 | Massaro et al. . |
| 5,597,312 | 1/1997 | Bloom et al. . |
| 5,808,907 | 9/1998 | Shetty et al. ............................. 702/188 |
| 5,808,908 | 9/1998 | Ghahramani ............................. 702/182 |

*Primary Examiner*—James P. Trammell
*Assistant Examiner*—Mussie K. Tesfamariam
*Attorney, Agent, or Firm*—Charlene Stukenborg

[57] ABSTRACT

A system and method is provided for monitoring and enhancing computer assisted performance. The method includes providing a user interface for a business terminal, measuring the performance of the user interaction with the user interface, adjusting parameters of the user interface to try to increase the performance of the user interaction, tracking whether the performance has increased, and causing an escalation event to occur if the user performance is below a predetermined level. The system and method preferably includes creating a user profile of the parameters that obtain the best performance for each user. This user profile may be created during new employee orientation but is updated continually as the user uses the business terminal to complete actual business transactions.

7 Claims, 3 Drawing Sheets

METHOD AND SYSTEM FOR MONITORING AND ENHANCING COMPUTER-ASSISTED PERFORMANCE

BACKGROUND OF THE INVENTION

The present invention relates to a method and system for monitoring and enhancing computer-assisted performance, particularly in a business terminal, such as a retail point-of-sale terminal or a financial automated teller machine (ATM).

Many businesses rely on their employees interacting with computerized business terminals, such as point-of-sale terminals or inventory control terminals, to complete transactions with customers. The computerized business terminals often have customized applications and user interfaces which vary from business to business. The workers often are not very knowledgeable about the computer systems in general and particularly a business' customized applications and interfaces.

For example, at Christmas time, retail outlets typically hire temporary customer service representatives, clerks or other workers to handle increased business. These temporary workers are often not familiar with the work to be performed and additionally are not familiar with the customized computer-based systems of the business, such as the point-of-sale equipment. Training of these temporary workers is expensive and time-consuming. Many times the temporary workers only receive between two and eight hours of training, and the training occurs remote from the actual floor or service area where the worker will be stationed. After this meager training, the temporary workers are stationed "on the floor" and expected to provide high quality service to the customer. The temporary workers can easily become frustrated and high turnover may result.

Similarly, customers of banks or other financial institutions are expected to interact with financial automated teller machines (ATMs) with little or no training. Some customers have little previous experience with the computer-based systems and do not find the interfaces very user-friendly. These customers may avoid using the ATMs and instead require the financial institution to provide services via a live teller, increasing costs.

Computer-assisted learning systems used as educational tools to help students with traditional learning activities are known. These learning systems often provide feedback to help a student learn, based on input from the student. These systems may even adjust the presentation of material to help the student learn if built-in testing indicates that the student has not mastered the desired concept. However, these systems are designed to teach new concepts to a certain level of expertise and then move on to other new concepts rather than to increase proficiency with standard, customized interfaces in a business environment.

It is also known to provide varying levels of information to users based on their skill level with a particular system such as a word processing system. However, the varying levels of information are provided in discrete levels such as for beginning or advanced users so that all parameters of the interface are adjusted based on the discrete level assigned to the user.

It is also known to provide simulated work problems on a computer-based system, but these systems are designed to train workers who will be using the system for a relatively long period of time and will gradually master different aspects of the system over the period of work. Since these systems are not provided while a worker is performing actual work or a customer is performing an actual financial transaction at an ATM, they do not help a new worker quickly succeed in the on-the-job work environment or the customer succeed with the generally cheaper-to-operate ATM. Therefore, whenever a new worker or a new customer is required to interact with the system, training expense and loss of productivity or efficiency occurs.

There is a need to provide a method and apparatus for monitoring and enhancing computer assisted performance, particularly in interactions with a business terminal, such as a retail point-of-sale terminal or an ATM.

SUMMARY OF THE INVENITON

In accordance with the teachings of the present invention, a system and method is provided for monitoring and enhancing computer assisted performance. The method includes providing a user interface for a business terminal, measuring the performance of the user interaction with the user interface, adjusting parameters of the user interface to try to increase the performance of the user interaction, tracking whether the performance has increased, and causing an escalation event to occur if the user performance is below a predetermined level. The system and method preferably includes creating a user profile of the parameters that obtain the best performance for each user. This user profile may be created during new worker orientation or during the customer's initial transaction but is updated continually as the worker uses the business terminal to complete actual business transactions or the customer uses the ATM to complete actual financial transactions.

It is an important feature of the present invention that the business terminal is actually used to perform business transactions while the system is measuring and adjusting to increase or enhance the performance of the worker assigned to use the terminal or the customer using the terminal.

Another important feature of the present invention is that an escalation event such as informing a supervisor of a problem as it is occurring is automatically provided based on measurements of the worker's responses at the terminal being used by the worker during actual, as opposed to simulated, business transactions. Similarly an escalation event such as calling a live teller is automatically provided based on measurements of the customer's responses at the terminal during actual, as opposed to simulated, financial transactions.

Yet another important feature of the present invention is that the user profile of parameters move with the worker as the worker uses different terminals of the computer-based business system. Similarly, for ATM customers, the user profile of parameters move with the customer as the customer uses different ATM terminals and performs different types of transactions at the different ATM terminals.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
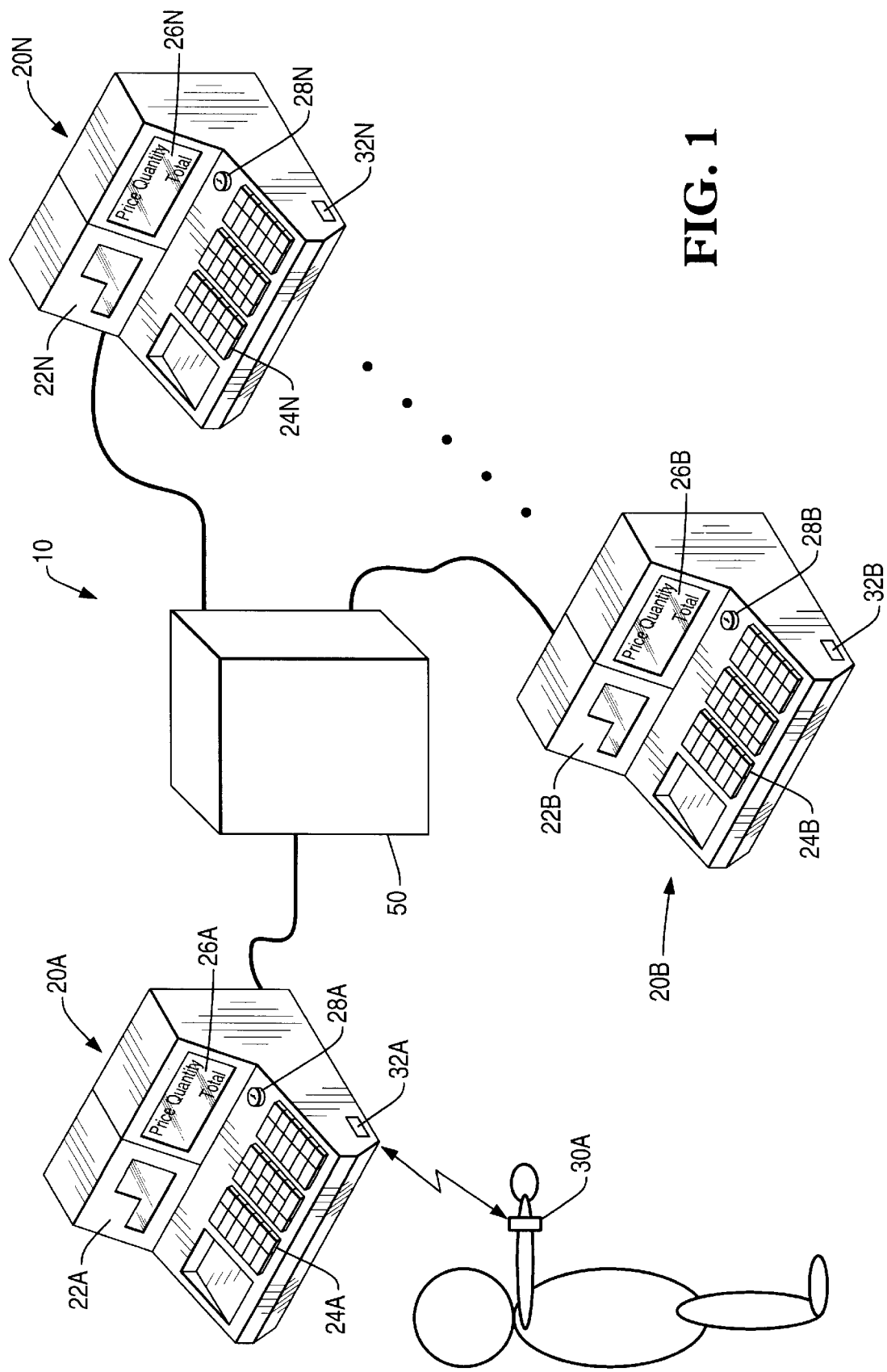
FIG. 1 is a block diagram of a computer system including retail point-of-sale terminals in accordance with a first embodiment of the present invention.

Referring now to the drawings, in which like-referenced characters indicate corresponding elements throughout the several views, attention is first drawn to FIG. 1 which shows a block diagram of a computer-based system for use with the present invention.

The computer-based system 10 includes a plurality of terminals 20A through 20N (where N represents that any number of terminals is contemplated) networked together for business purposes such as retail point-of-sale terminals, inventory control terminals, product ordering terminals or the like. The computer-based system 10 also preferably includes a main or central processing and storage device 50. Terminals 20A through 20N and/or main or central processing and storage device 50 include the necessary applications, interfaces, and hardware to provide a functioning business terminal. Example terminal 20A will be used as a representative terminal to describe the aspects of the present invention.

Terminal 20A includes a display or monitor 22A and an input device 24A. Input device 24A may be a keyboard, a digitizer, a scanner, a mouse, a trackball, a touch screen or any other known input device. Terminal 20A also includes a plurality of user interfaces 26A which are designed to assist the worker in completing a transaction. Various aspects of user interfaces 26A will be discussed below.

Terminal 20A may also include a key mechanism 28A, a biometer 30A and a biometer receiver 32A. The key mechanism 28A may insure that only authorized workers can operate the terminal. This key may open up the cash dispenser, power-up the unit and allow general access to the computer system. This key or a user password may be required to enter the system and to access the worker's user profile. The password may identify who the worker is and present the user interfaces which the worker is familiar and most productive with and determines the worker's level of competence.

The biometer 30A can be any standard monitor and is preferably used for measuring the worker's pulse rate and temperature. The biometer 30A may be conveniently attached to the worker's wrist as a band or may be clipped or otherwise attached to the worker in a manner which enables the biometer to measure the worker's responses. If embodied as a non-intrusive appliance (such as a lapel pin or wrist band), the biometer 30A need not be connected by wires to the terminal 20A. The biometer 30A can include a transmitter which communicates with a biometer receiver 32A. Information can be transmitted by cellular, wave communications, or other wireless technology. Using wireless communications, the worker can move from terminal to terminal and as the worker approaches a new terminal, the worker's biometer transmits information to and receives information from the system. This transfer of information allows for fast and secured access to a terminal with the personalized interface and performance based system following the worker. Thus, the biometer 30A becomes a personal communicator.

Examples of standard monitors include biometers commonly found on equipment in health clubs to monitor heartrate (pulse) and other body responses. Additionally, measures of temperature are marketed as strips that can be placed on one's forehead to determine body temperature. Additionally, portable medical facilities typically include relatively compact biometers, however for the present invention, it is probably not necessary to have a medical grade biometer.

In the retail environment, for example, user interfaces 26A include terminal screens for inputting items and providing the corresponding price for an item as well as calculating the tax and providing a total amount for the customer to pay. User interfaces 26A may also include screens for assisting in processing returns, in processing price corrections, in checking inventories of a particular item in that store or in associated stores, and any other transactions typically occurring in the retail environment. (A screen is intended to indicate the layout of items presented on the terminal display 22A. This may be determined by standard or customized programming and preferably uses the parameters of the user profile in the programming to provide further customization.)

User interfaces 26A (and the programming to produce them) use a plurality of parameters which determine how the information is displayed, how much information is displayed, how long (in time) information is displayed, etc. User interfaces 26A are intended to include multi-sensory indicators such as beeps, bells, voice and voice recognition, or other appropriate sounds along with the visual screens.

Figure 2:
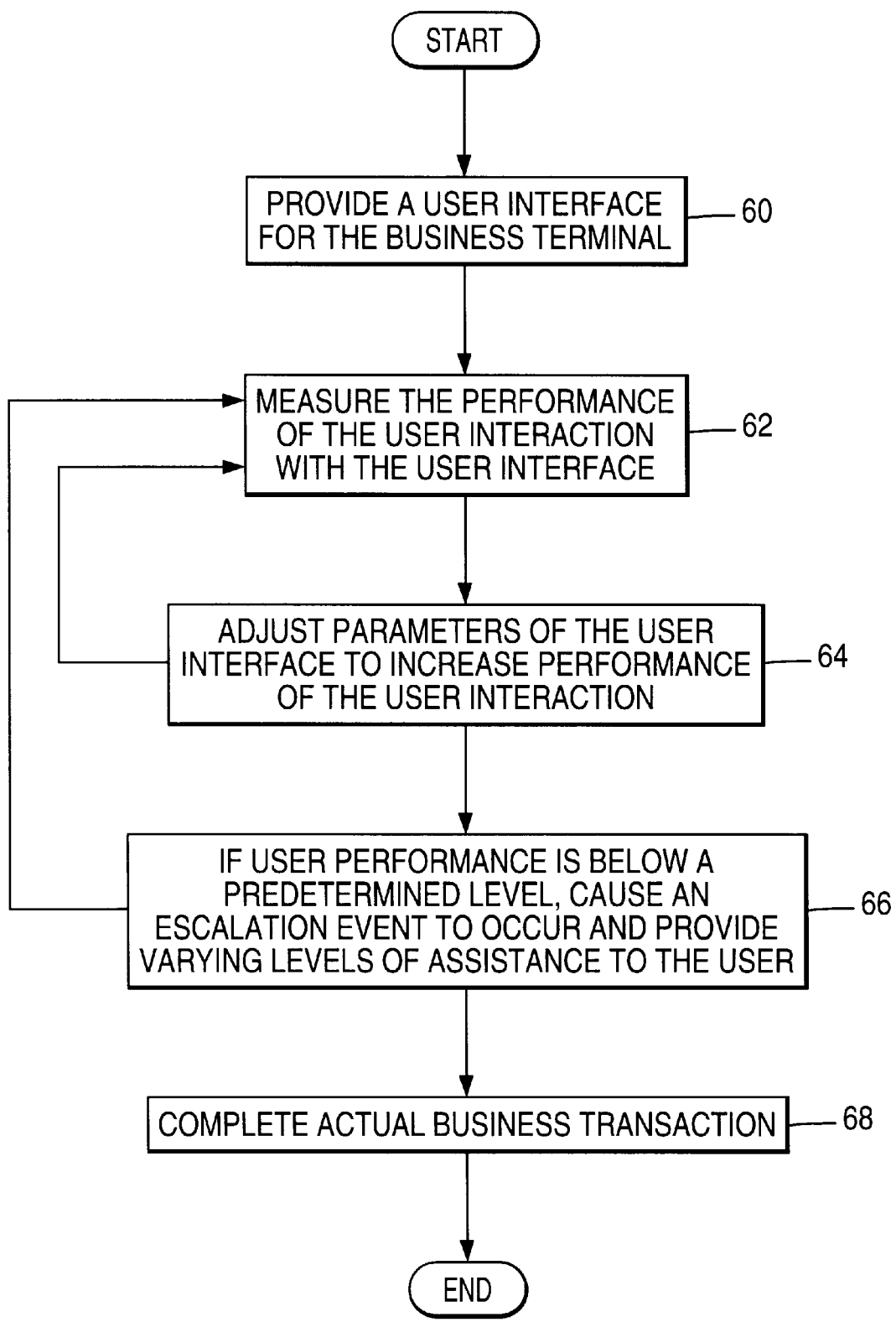
FIG. 2 is a flowchart of the operation of the present invention.

Referring to FIG. 2, a flowchart of the operation of the present invention is provided. First, in step 60, a user interface for the business terminal is provided. The user interface is preferably configured using parameters stored in a user profile file. Then, in step 62, the system measures the performance of the user interaction with the user interface. In step 64, the system adjusts the parameters of the user interface to increase performance of the user interface. The adjusted parameters are preferably stored in the user profile file. In step 66, if user performance is below a predetermined level, then the system causes an escalation event to occur and provides varying levels of assistance. As the flowchart in FIG. 2 indicates, after adjusting the parameters or causing an escalation event, the system continues to measure the performance of the user interaction in step 62 and continues on to steps 64 and 66 as appropriate. Finally, in step 68, the user completes the actual business transaction.

As an example, if a relatively long informational message is displayed requiring several seconds for the user to read, and the user routinely starts inputting the next information before the long informational message could be read, then the system adjusts and provides either no or a brief reminder message (as it is obvious this user does not require the contents of the long informational message). The system then tracks (preferably through programming) to insure that performance has indeed improved. If the system measurements indicate that performance has decreased, such as if the worker inputs the wrong information since the informational message is brief or non-existent, then the interface parameters will again be adjusted. The interface may change radically, very slightly, or hardly noticeably or any increment in between. If a radical change is required, the interface may completely change to include a completely new interface that includes graphics, video clip lead through, simulation, etc.

Measurements for the present system can include how long it takes the worker to input the desired information, if wrong keys are pressed before the correct key is pressed, etc. which can be determined through standard programming. Other measurements are taken through the biometer 30A. The biometer preferably includes a biometer communication receiver 32A which monitors the worker's physical responses so that the user interfaces can be updated to help increase the worker's proficiency. The biometer receiver feeds the worker's pulse rate and temperature to the computer system. The worker's transaction speed, correct operation sequence, combined with the pulse rate and the worker's temperature helps the system to continuously monitor and improve performance through changes in the user interface and/or escalation events.

Another example using the present invention includes the customizing of a touch screen for right or left handed workers, or handicapped workers. The system, through standard monitoring techniques, determines that a worker takes a longer than normal or standard time to hit the "total" key after scanning or otherwise inputting all the items. The system can redefine the area of the screen which indicates the "total" key has been pressed to an area more comfortable for a left-handed or handicapped worker and determine if the performance is increased. If the performance is increased, then the system will store that information so the worker's user interface will be configured to provide increased performance regardless of the actual business terminal used by the worker.

The main or central processing and storage device 50 should be large enough to run the required business applications as well as the system of the present invention so the user performance can be measured, user interface parameters adjusted, and overall performance tracked while the worker is completing actual customer transactions. Use of a central server or other central storage device allows the user profile of the "best" parameters to follow the worker to any business terminal the worker is required to use.

An escalation event occurs when the performance is determined by the monitoring system of the present invention to be questionable. For example, if the worker's pulse rate is rising and the transaction throughput is dropping (or dropped), the first level of escalation can be non-intrusive to the worker and can change the worker's terminal interface and/or otherwise present the information to the worker in a format intended to enhance performance.

If the first level of escalation is not effective, then the second level of escalation can provide onscreen training or performance support guiding or hand holding the worker through the steps. At the same time that the onscreen guidance is provided, a signal can be sent to the supervisor's beeper or personal communicator monitor to indicate that the second level of escalation has been reached. A message can flash on the supervisor's monitor or beeper indicating the "who, what, where, when and why" of the situation at the second level of escalation. The supervisor may call the appropriate workstation and guide the worker through the situation. In this instance, the supervisor may be at a help desk monitoring the workstations from many miles away. If the escalation at the second level is not effective, then the third level of escalation may include dispatching a supervisor to physically go to the associated workstation and to assist the worker.

The whole system is intended to support continuous learning, improve productivity, and to reduce cost of completing business transactions. The system is intended to be personalized to the worker, relatively non-intrusive, and intuitive. The applications need not be local but could be located on a computer miles away linked through communications. Alternatively, the applications could be local to the user terminal with only the user profile parameters being transferred over the network to the different terminals.

Figure 3:
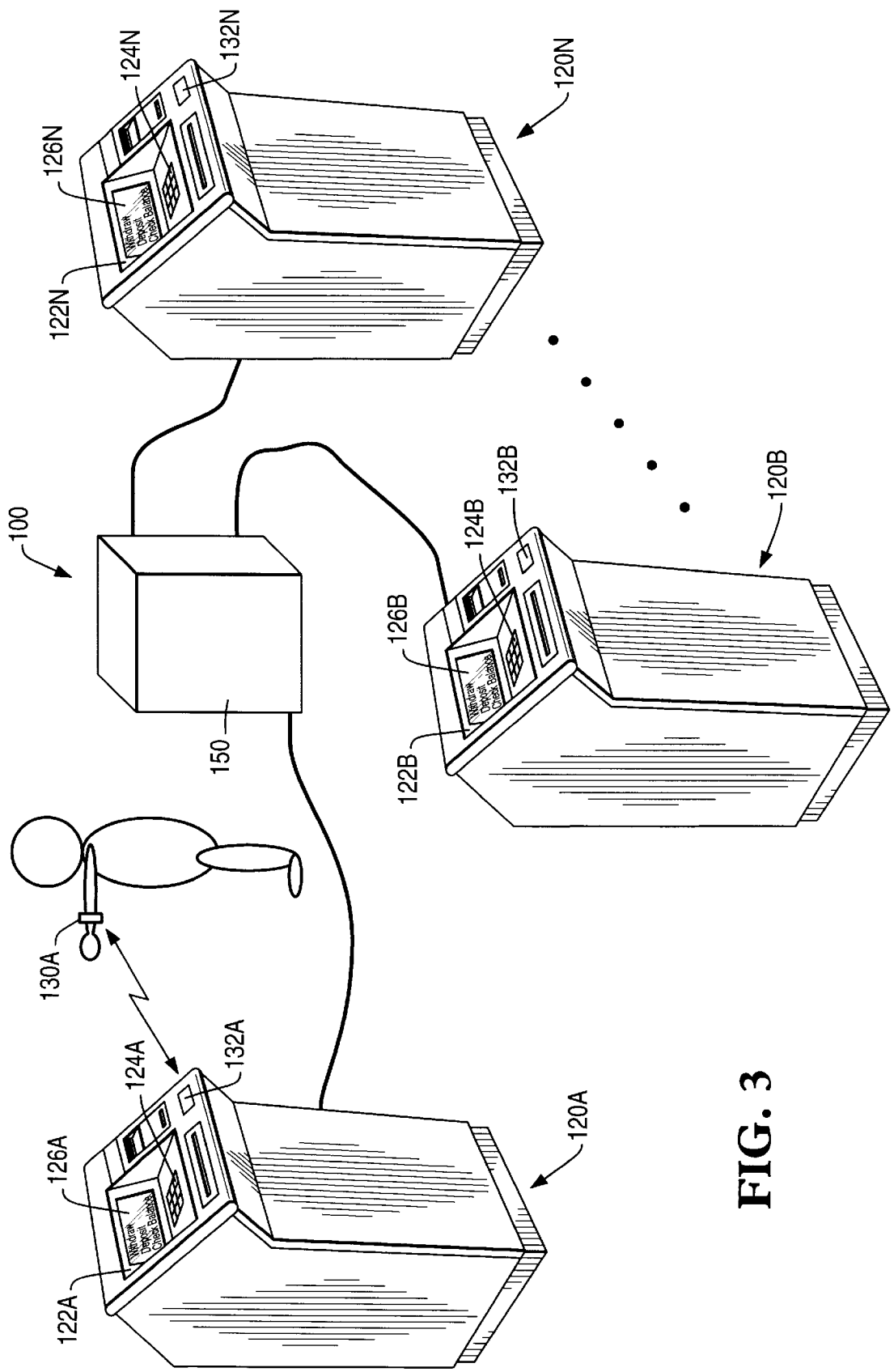
FIG. 3 is a block diagram of an ATM network in accordance with a second embodiment of the present invention.

A second embodiment of the present invention is provided for use with the system 100 of FIG. 3. System 100 includes a central server or other large processing and storage device 150 which may be located in a bank's main office. System 100 also includes a plurality of ATMs 120A through 120N (where N represents that any number of ATMs is contemplated). ATMs include displays 122A through 122N and user input devices 124A through 124N. User displays 122A through 122N may have a plurality of user interfaces 126A which may be adjusted in accordance with the present invention. The interface can include multimedia and multi-sensory interfaces. The system can also include a biometer 130A and a biometer receiver 132A, such as described above for the first embodiment of the present invention.

In operation, a customer initiates a transaction such as by inserting a bank card and entering a personal identification number. Upon initiation, the ATM user display 122A presents the information in a manner that the customer encountered the last time the customer interacted with the system, to provide the information and timing that is most agreeable to the customer. For customers responding at a fast pace during an initial transaction with an ATM, the system determines that the customer has a high level of competence so fewer detailed screens 126A are provided. Thus, the customer can rapidly select the required information and complete the transaction rapidly. This increase in transaction time reduces the customer's time at the ATM and allows more customers to be handled by the machine in an efficient manner.

However, if a customer has a slower pace of response during an initial transaction with the ATM, the system determines that the customer has a lower level of competence and the user interfaces are presented to help bring the customer "up to speed" but while still being compatible with the customer's skill. Through several interactions, the customer's response time is increased, allowing more customers to utilize the ATM and increase the efficiency of the system.

For example, a typical ATM has the following sequence of screens:

Screen 1 requests the user input his PIN.
Screen 2 inquires
  1) withdrawal
  2) check balance
  3) deposit
  4) pay bills
Screen 3 (if option 1 is selected)
  1) from checking
  2) from savings
Screen 4 inquires
  1) $20
  2) $50
  3) $100
  4) other amount (enter in multiples of 10)

According to the present invention, if the customer typically withdraws money from a checking account, Screen 2 could be personalized to provide the following options:

Screen 2A inquires
  1) withdraw $XX from checking; (where XX is the amount typically withdrawn)
  2) withdraw another amount from checking; (then customer is prompted to enter that amount)
  3) return to standard menus This personalized menu can increase the customer's performance and enable more customers to access a machine while increasing customer satisfaction.

As another example, if a user has a slow response time or measurements from the biometer indicate that the customer is probably confused or intimidated, the menus may provide more complete descriptions to help the customer make selections and/or may suggest a response if the customer typically performs a specific transaction.

As described above with respect to the first embodiment, an escalation event can occur when the performance of the customer is determined by the monitoring system of the present invention to be questionable. For example, the first level of escalation can be non-intrusive to the customer and can change the customer's interface and/or otherwise present the information to the customer in a format intended to enhance performance. If the first level of escalation is not effective, then the second level of escalation can provide onscreen training or "hand-holding" the customer through the steps. At the same time that onscreen guidance is provided, a signal can be sent to an assigned teller to indicate that the second level of escalation has occurred at a specific machine. The teller may call the customer at the ATM (if a phone is provided as part of the station) and guide the customer through the situation. Alternatively, if the ATM has videoconferencing facilities, these may be used to enable the teller to instruct the customer. If the escalation at the second level is not effective, then the third level of escalation can include dispatching a teller to physically go to the associated ATM (most likely if the ATM is located in or near a staffed banking facility).

Although these examples involve modifications to the ATM screen displays, it is envisioned that any aspect of a multimedia and multi-sensory interface may be altered where security allows. For example, if an ATM has audio capabilities, the system of the present invention may adjust to provide audio messages which assist the customer to provide the required responses in as efficient a manner as is possible.

Although the invention has been described with particular reference to certain preferred embodiments thereof, variations and modifications of the present invention can be effected within the spirit and scope of the following claims.

What is claimed is:

1. A method for monitoring and enhancing computer-assisted performance with a business terminal, comprising the steps of:

providing a user interface for the business terminal;

measuring the performance of the user interaction with the user interface;

adjusting parameters of the user interface to increase performance of the user interaction, wherein the parameters of the user interface are independently adjustable to conform to a particular user's performance; and causing an escalation event to occur if the user performance is below a predetermined level.

2. The method of claim 1 wherein the parameters of the user interface are stored in a user profile file.

3. The method of claim 1 wherein the user interface is multi-sensory.

4. The method of claim 1 wherein the business terminal is an automated teller machine.

5. The method of claim 1 wherein the step of causing an escalation event to occur if the user performance is below a predetermined level includes providing varying levels of assistance to the user depending on a level of the escalation event.

6. A method for monitoring and enhancing computer-assisted performance with a business terminal engaged in actual business transactions, comprising the steps of:

providing a user interface for the business terminal wherein parameters of the user interface are independently adjustable to conform to a particular user's performance;

measuring the performance of the user interaction with the user interface;

adjusting the parameters of the user interface to increase performance of the user interaction;

causing an escalation event to occur if the user performance is below a predetermined level, wherein the escalation event occurs at varying levels;

providing varying levels of assistance to the user depending on the level of the escalation event; and completing the actual business transactions.

7. A system for monitoring and enhancing computer-assisted performance with a business terminal, comprising:

a plurality of independent parameters associated with various aspects of the interface;

means for measuring the performance of the user interaction with the user interface;

means for adjusting the independent parameters of the user interface to increase performance of the user interaction, wherein the parameters of the user interface are independently adjustable to conform to a particular user's performance; and means for causing an escalation event to occur if the user performance is below a predetermined level.

* * * * *